（12) United States Patent
Park et al.

(10) Patent No.: US 9,517,508 B2
(45) Date of Patent: Dec. 13, 2016

(54) CONVERGENCE MACHINING APPARATUS BASED ON TURNING

(71) Applicant: KOREA INSTITUTE OF MACHINERY & MATERIALS, Daejeon (KR)

(72) Inventors: Jong-Kweon Park, Daejeon (KR); Seung Kook Ro, Daejeon (KR); Byung-Sub Kim, Daejeon (KR); Sung Cheul Lee, Daejeon (KR); Gyung Ho Khim, Daejeon (KR); Sung-Kwon Jang, Daejeon (KR); Soo Chang Choi, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 74 days.

(21) Appl. No.: 14/053,678

(22) Filed: Oct. 15, 2013

(65) Prior Publication Data

US 2014/0230617 A1    Aug. 21, 2014

(30) Foreign Application Priority Data

Feb. 21, 2013  (KR) .......................... 10-2013-0018588

(51) Int. Cl.
 *B23Q 39/00*  (2006.01)
 *B23B 3/06*   (2006.01)
 *B23Q 41/08*  (2006.01)
 *B23Q 1/01*   (2006.01)

(52) U.S. Cl.
 CPC ............... *B23B 3/065* (2013.01); *B23Q 1/017* (2013.01); *Y10T 82/2531* (2015.01)

(58) Field of Classification Search
 CPC ........... B23Q 1/017; B23B 3/065; B23B 3/06; Y10T 82/2531; Y10T 82/2566
 USPC .................. 82/121, 142, 149, 148, 141, 129
 See application file for complete search history.

(56) References Cited

U.S. PATENT DOCUMENTS

| 3,078,547 | A | * | 2/1963  | Sweet ............................. 407/71    |
| 3,546,988 | A | * | 12/1970 | Behnke .................... B23B 5/165 82/101 |
| 3,811,346 | A | * | 5/1974  | Nomura ..................... B23B 7/06 29/37 A |
| 4,461,121 | A | * | 7/1984  | Motzer et al. .................... 451/5    |
| 4,475,421 | A | * | 10/1984 | Cudnohufsky ................. 82/138        |
| 4,478,117 | A | * | 10/1984 | Brown et al. .................. 82/149      |
| 4,607,460 | A | * | 8/1986  | Mushardt ......................... 451/4    |
| 4,776,247 | A | * | 10/1988 | Kiya .............................. 82/118   |
| 4,777,713 | A | * | 10/1988 | Kitamura ........................ 483/22    |
| 5,323,572 | A | * | 6/1994  | Guenin ........................... 451/21   |

(Continued)

FOREIGN PATENT DOCUMENTS

JP   58-109201    6/1983
WO   2008/093055  8/2008

*Primary Examiner* — Sara Addisu
(74) *Attorney, Agent, or Firm* — Lex IP Meister, PLLC

(57) ABSTRACT

Disclosed is a convergence machining apparatus based on turning in which a rotational axis of a work piece fixed by a headstock and a tailstock and a center of a width of a slide surface of a bed on which a reciprocal carriage installed with a tool is transferred while being supported are positioned at the same virtual plane, thereby preventing an offset error according to a relative displacement between the work piece and the tool during processing.

13 Claims, 7 Drawing Sheets

(56) References Cited

U.S. PATENT DOCUMENTS

| | | | | |
|---|---|---|---|---|
| 5,662,524 | A * | 9/1997 | Esser | B23B 29/24 |
| | | | | 408/153 |
| 6,039,634 | A * | 3/2000 | Bach et al. | 451/49 |
| 6,640,677 | B2 * | 11/2003 | Ueda et al. | 82/129 |
| 6,938,313 | B2 * | 9/2005 | Viola et al. | 29/33 T |
| 7,089,836 | B2 * | 8/2006 | Kato et al. | 82/1.11 |
| 7,266,871 | B2 * | 9/2007 | Takeuchi et al. | 29/27 C |
| 8,020,267 | B2 * | 9/2011 | Akiyama | 29/40 |
| 8,186,249 | B2 | 5/2012 | Sasu | |
| 2004/0050222 | A1 * | 3/2004 | Sakashita | 82/148 |
| 2004/0187654 | A1 * | 9/2004 | Kato et al. | 82/1.11 |
| 2005/0056125 | A1 * | 3/2005 | Trumper | 82/1.11 |
| 2009/0121113 | A1 * | 5/2009 | Yasuda et al. | 248/429 |
| 2009/0320656 | A1 * | 12/2009 | Sasu | 82/129 |
| 2011/0079121 | A1 * | 4/2011 | Ishioka | 82/1.11 |
| 2011/0290089 | A1 * | 12/2011 | Martens et al. | 82/121 |
| 2012/0103150 | A1 * | 5/2012 | Fukuoka et al. | 82/121 |
| 2013/0160619 | A1 * | 6/2013 | Lee | 82/149 |
| 2014/0020524 | A1 * | 1/2014 | Yang | B23Q 1/012 |
| | | | | 82/122 |

\* cited by examiner

M : M1,M2,M3,M4

CONVERGENCE MACHINING APPARATUS BASED ON TURNING

CROSS-REFERENCE TO RELATED APPLICATION

This application claims priority to and the benefit of Korean Patent Application No. 10-2013-0018588 filed in the Korean Intellectual Property Office on Feb. 21, 2013, the entire contents of which are incorporated herein by reference.

BACKGROUND OF THE INVENTION (a) Field of the Invention

The present invention relates to a convergence machining apparatus based on turning. More particularly, the present invention relates to a convergence machining apparatus based on turning performing a process in a state that a work piece is rotated.

(b) Description of the Related Art

FIG. 1 schematically discloses a conventional turning machining apparatus as a background technique of the present invention.

As shown in FIG. 1, according to a basic structure of a conventional turning machining apparatus, a slide surface B-S is formed on a bed B, and a reciprocal carriage R mounted with a processing module T is transferred along the slide surface B-S. Also, a cylindrical work piece S is mounted and processed between a headstock (not shown) and a tailstock (not shown).

On the other hand, the processing module T (for example, a turning processing tool) capable of controlling a processing depth is mounted at one side of the work piece S However, in the conventional turning machining apparatus, a relative displacement may be generated during the processing due to an offset (Ex, Ey) between the slide surface B-S and the center C of rotational axis of the work piece. This is because the work piece is slightly moved during the processing in an arrow (V) direction shown on the work piece S of FIG. 1 and it acts as a cause of accuracy deterioration according to a relative displacement between the processing module T and the work piece.

In other words, in a machining apparatus requiring high accuracy processing, the offset error generated in the processing acts as a main cause deteriorating the processing accuracy such that it is necessary to be improved.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a convergence machining apparatus based on turning that removes an offset error generated by a relative displacement between a tool and a work piece by squaring a rotational axis of a work piece, a headstock, a tailstock, and a reciprocal carriage installed with tools into a virtual same plane with respect to a slide surface of a bed.

Also, the present invention provides a convergence machining apparatus based on turning processing in convergence milling, fast tool servo (hereafter referred to as "FTS") processing, and fine pattern laser processing as well as a turning process for a cylindrical work piece surface in a single machining apparatus, and simultaneously manufactured with a structure that removes the above offset error.

The objects of the present invention are not limited to the above-mentioned objects, and other non-mentioned objects can be clearly understood to those skilled in the art from the following description.

A convergence machining apparatus based on turning in which a rotational axis of a work piece fixed by a headstock and a tailstock and a center of a width of a slide surface of a bed on which a reciprocal carriage installed with a tool is transferred while being supported are positioned at the same virtual plane is provided, thereby preventing an offset error according to a relative displacement between the work piece and the tool during processing.

The virtual plane in which the rotational axis of the work piece and the center of the width of the slide surface of the bed are positioned may be extended in a horizontal direction.

The virtual plane in which the rotational axis of the work piece and the center of the width of the slide surface of the bed are positioned may be obliquely extended by a predetermined angle ($\theta$) from a horizontal direction.

The headstock and the tailstock may include a supporting surface supported by the slide surface of the bed, and a center of a width of the supporting surface may be positioned on the virtual plane.

Also, a convergence machining apparatus based on turning according to an exemplary embodiment of the present invention includes: a bed including a slide surface disposed at both ends of a width direction of an upper surface, a headstock fixed at one side on the bed, and fixing a work piece to be rotated for a rotational axis of the work piece to be positioned at the same virtual plane as a center of a width of the slide surface, a tailstock installed at the other side of the bed to be moved and fixing the work piece for the rotational axis of the work piece to be positioned at the same virtual plane as the center of the width of the slide surface at an opposite side of the headstock, and a reciprocal carriage supported by the slide surface while surrounding at least a portion of the work piece fixed between the headstock and the tailstock from the outside and including a processing module thereby being guided along the slide surface and being installed to be movable.

A plurality of processing modules disposed at a predetermined interval on the reciprocal carriage and respectively installed to have a tip be arranged toward the rotational axis of the work piece to perform different processing may be further included.

The plurality of processing modules may include a processing module selected from a pair of turning processing modules arranged opposite to each other toward the rotational axis of the work piece from both sides of the reciprocal carriage and performing turning processing, a FTS (Fast Tool Servo) processing module performing FTS processing, a milling processing module mounted from an upper side of the reciprocal carriage toward the rotational axis of the work piece and performing milling processing, and a laser processing module performing laser processing.

The virtual plane in which the rotational axis of the work piece and the center of the width of the slide surface of the bed are positioned may be extended in a horizontal direction.

The virtual plane in which the rotational axis of the work piece and the center of the width of the slide surface of the bed are positioned may be obliquely extended at a predetermined angle ($\theta$) from a horizontal direction.

A headstock fixing block fixed at one side on the bed and surrounding the headstock to be fixed, and a tailstock moving block formed to be moved at the other end on the bed thereby surrounding the tailstock and moving the tailstock when attaching and detaching the work piece may be further included, and the headstock fixing block and the tailstock moving block may symmetrically face each other on the bed thereby forming a rhombus shape.

The reciprocal carriage may include a lower body curved downward via the work piece fixed between the headstock and the tailstock.

The reciprocal carriage may further include an upper body connected to be attachable and detachable to the end portion of both sides of the lower body and curved upward with respect to the work piece thereby forming an arch shape.

Both ends of the width direction of the bed may be symmetrical in structural shape, dimensions and mass, in reference to the rotational axis of the work piece.

According to the convergence machining apparatus based on turning according to an exemplary embodiment of the present invention, the rotational axis of the work piece, the headstock, the tailstock, and the reciprocal carriage installed with the tools may coincide into the same virtual plane with respect to the slide surface of the bed configuring the machining apparatus, thereby removing the offset error according to the mutual relative displacement. Accordingly, the relative displacement between the tool and the work piece is suppressed such that a vibration and a thermal displacement are minimized, thereby improving accuracy of the machining apparatus. Particularly, in a case of a device requiring high accuracy and fine processing, the effect may be maximized.

Also, according to an exemplary embodiment of the present invention, the offset error of the machining apparatus is removed, and simultaneously the milling of the cylindrical work piece surface, the FTS processing, and the fine pattern laser processing as well as the turning processing may be performed in the single machining apparatus in convergence.

DETAILED DESCRIPTION OF THE EMBODIMENTS

Figure 1:
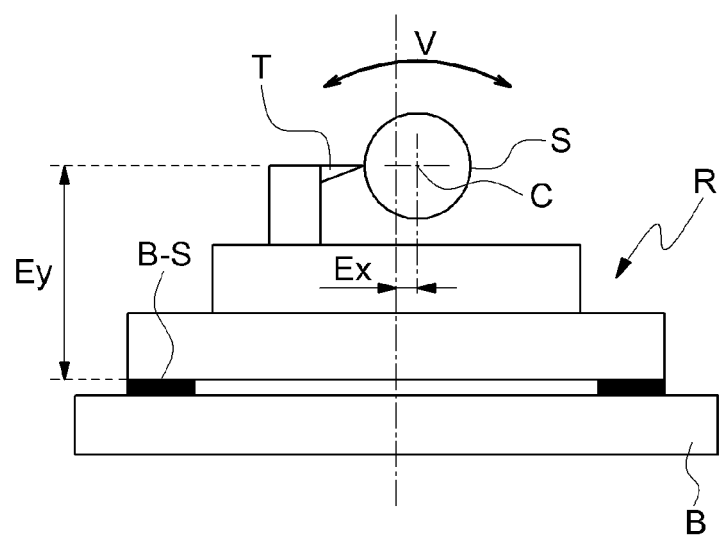
FIG. 1 is a view to explain a concept of a conventional turning machining apparatus.

The advantages and characteristics of the present invention and means for achieving them will become apparent from the following detailed description of the exemplary embodiments and the accompanying drawings. However, the present invention is not limited by the exemplary embodiments disclosed hereafter, and may be modified in various different ways. The present exemplary embodiments provide complete disclosure of the present invention and complete information of the scope of the present invention to those skilled in the art, and the present invention is defined by the scope of the claims. In the following description, detailed explanation of known related functions and constitutions may be omitted to avoid unnecessarily obscuring the subject matter of the present invention.

Hereinafter, referring to the drawings, a convergence machining apparatus based on turning according to an exemplary embodiment of the present invention will be described.

Figure 2:
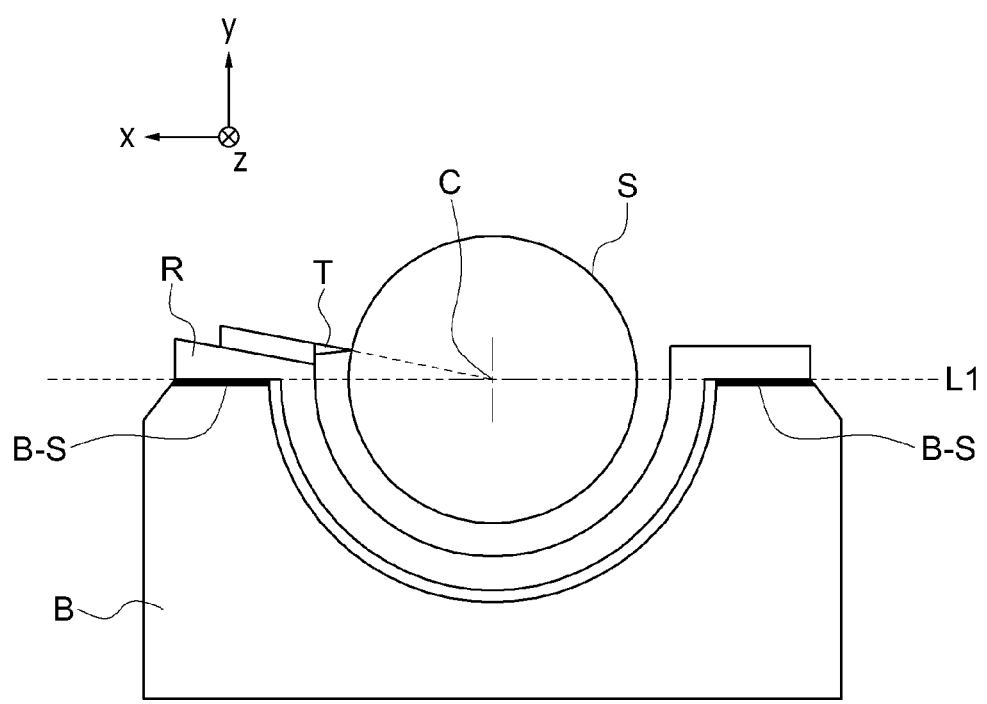
FIG. 2 is a cross-sectional configuration diagram of a convergence machining apparatus based on turning according to an exemplary embodiment of the present invention.
Figure 3:
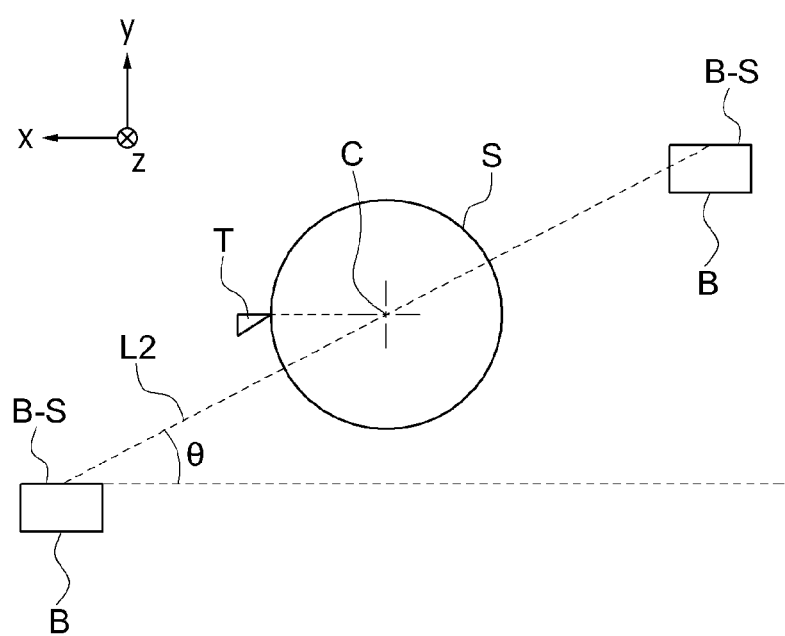
FIG. 3 is a cross-sectional configuration diagram of a convergence machining apparatus based on turning according to another exemplary embodiment of the present invention.

FIG. 2 is a cross-sectional configuration diagram of a convergence machining apparatus based on turning according to an exemplary embodiment of the present invention, and FIG. 3 is a cross-sectional configuration diagram of a convergence machining apparatus based on turning according to another exemplary embodiment of the present invention.

Referring to FIG. 2, in a case of a convergence machining apparatus based on turning according to an exemplary embodiment of the present invention, a center C of rotational axis of a work piece S fixed by a headstock and a tailstock that are not shown and a slide surface B-S of a bed B in which a reciprocal carriage R mounted with a processing module T is guided and transferred are horizontally positioned according to the same virtual straight line L1. That is, when the work piece S fixed by the headstock and the tailstock rotates on the rotational axis, the rotational axis may be positioned on the same virtual plane as the slide surface B-S of the bed B.

The virtual plane may be a plane formed by the rotational axis and the virtual straight line L1, and may extend in a direction parallel with z-x plane in FIG. 2. Also, the slide surface B-S of the bed B is a surface on which the reciprocal carriage R mounted while the processing module T is supported and transferred, and may be a surface supporting the headstock and tailstock thereby supporting the work piece S. Accordingly, an offset error may be generated in a processing according to a relative displacement therebetween.

In the conventional art, as shown in FIG. 1, an offset (Ex, Ey) exists between the slide surface B-S of the bed B and the rotational axis of the work piece S in a transverse direction (x-axis direction in drawing) or a longitudinal direction (y-axis direction in drawing), and this causes a relative displacement by a moment generated in the processing.

Accordingly, in the present exemplary embodiment, the center C of rotational axis of the work piece S may be mutual-horizontally disposed on the same virtual straight line L1 with respect to the slide surface B-S of the bed B, as shown in FIG. 2. Also, the transferring surface of the reciprocal carriage R mounted with the processing module T also coincides with the same virtual straight line L1 as the center C of rotational axis of the work piece S, thereby excluding the generation of the offset error that was shown in FIG. 1. Accordingly, processing accuracy may be improved.

FIG. 3 is a cross-sectional configuration diagram of a convergence machining apparatus based on turning according to another exemplary embodiment of the present invention.

In a case of an exemplary embodiment shown in FIG. 3, the center C of rotational axis of the work piece S fixed by the headstock, and the tailstock is equally positioned on the same virtual straight line L2 as the slide surface B-S of the bed B, however the same virtual straight line L2 in this exemplary embodiment may be formed to be obliquely extended with a predetermined angle (θ) from a horizontal direction (x-axis direction in FIG. 3) differently from the same virtual straight line L1 of FIG. 2. That is, when the work piece S fixed by the headstock and tailstock rotates on the rotational axis, the rotational axis is positioned on the virtual plane connecting the center of the width direction of the slide surface of one side (a lower side) and the center of the width direction of the slide surface B-S of the other side (an upper side) of the bed B.

The virtual plane may be the plane formed by the rotational axis and the virtual straight line L2. The width of the slide surface B-S may extend in a direction that is perpendicular to the rotational axis of the work piece S as well as parallel with the slide surface B-S, and the center of the width of the slide surface B-S may be the centers of each of the slide surface B-S disposed at either side of the work piece S. The virtual straight line L2 is formed by obliquely extending the virtual straight line L1 of FIG. 2 with the predetermined angle (θ) from the horizontal direction thereby configuring various machining apparatuses. Accordingly, work convenience of the convergence machining apparatus based on turning that is actually manufactured through the various exemplary embodiments may be improved.

Figure 4:
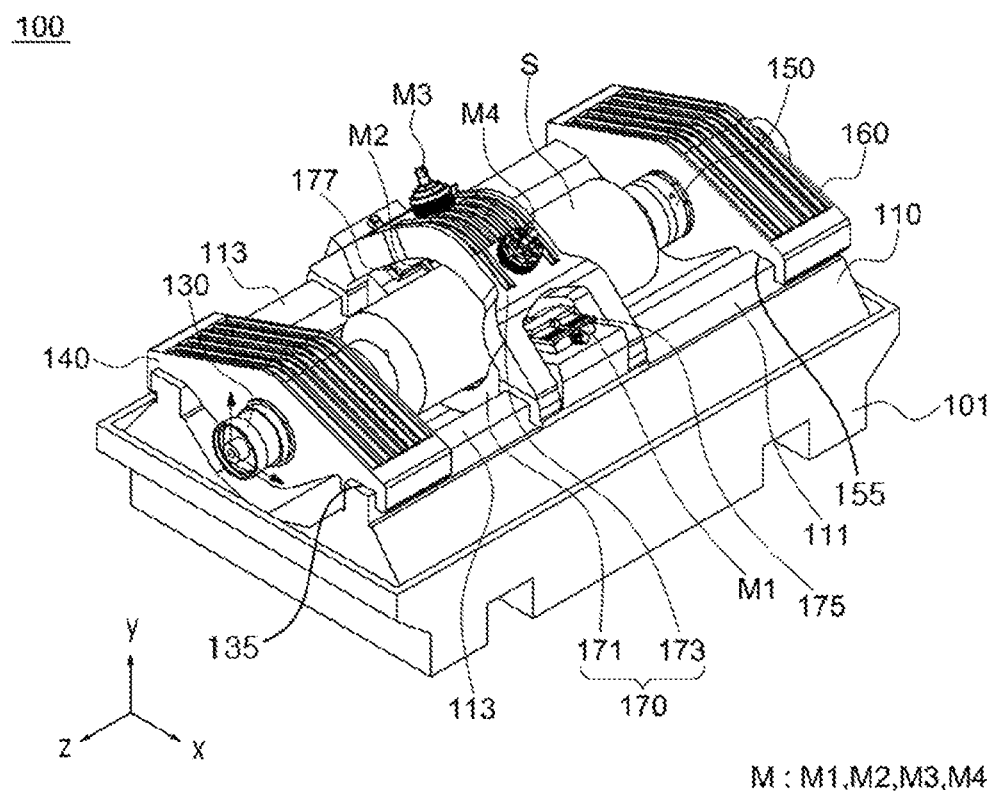
FIG. 4 is a perspective view of a convergence machining apparatus based on turning according to an exemplary embodiment of the present invention.
Figure 5:
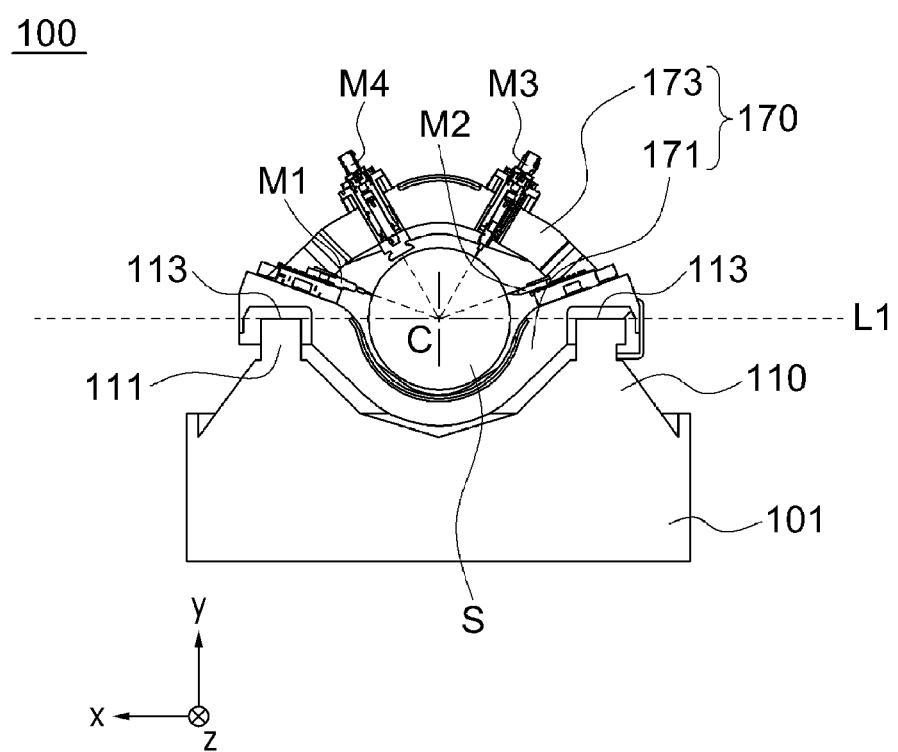
FIG. 5 is a center cross-sectional view of the convergence machining apparatus based on turning shown in FIG. 4 in a length direction.
Figure 6:
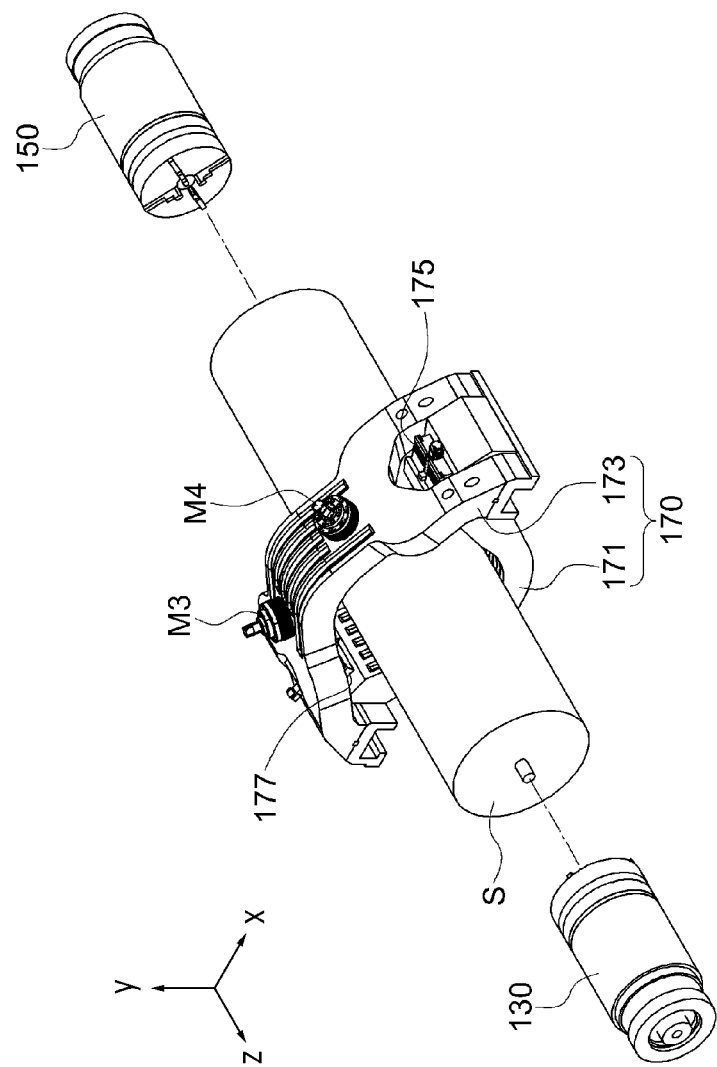
FIG. 6 is an exploded perspective view separately showing a reciprocal carriage mounted with a plurality of processing module, and a headstock and a tailstock fixing a work piece in the convergence machining apparatus based on the turning shown in FIG. 4.

The concept of the present invention confirmed through the convergence machining apparatus based on turning shown in FIG. 2 is more clearly described through a detailed exemplary embodiment of the convergence machining apparatus based on turning shown in FIG. 4 to FIG. 6.

FIG. 4 is a perspective view of a convergence machining apparatus based on turning according to an exemplary embodiment of the present invention, FIG. 5 is a center cross-sectional view of the convergence machining apparatus based on turning shown in FIG. 4 in a length direction, and FIG. 6 is an exploded perspective view separately showing a reciprocal carriage mounted with a plurality of processing modules and a headstock and a tailstock fixing a work piece in the convergence machining apparatus based on turning shown in FIG. 4.

Referring to FIG. 4 to FIG. 6, the convergence machining apparatus 100 based on turning includes the bed 110, the headstock 130, the tailstock 150, the reciprocal carriage 170, and a plurality of processing modules M.

A pair of linear guide blocks 111 are horizontally disposed in parallel to each other at both sides of the upper surface of the bed 110. A slide surface 113 is provided according to each guide block 111.

The bed 110 has a shape of which the center of the upper surface is concavely depressed, and thereby, particularly, the work piece S fixed in the machining apparatus 100 by the headstock 130 and the tailstock 150 that will be described later may be disposed according to the length direction (z-axis direction in drawing) at the inner center of the upper part when the work piece S is disposed according to the length direction. The work piece S may be formed with a cylindrical shape.

The slide surface 113 of the guide block 111 becomes a reference for the headstock 130, the tailstock 150, and the reciprocal carriage 170 mounted with a plurality of processing modules M that are horizontally positioned on the same plane. That is, the supporting surface 135 and 155 of the headstock 130 and the tailstock 150 and the transferring surface of the reciprocal carriage 170 may be positioned on the same virtual plane as the slide surface 113, and the rotational axis of the work piece S may also be positioned on the virtual plane. Accordingly, the offset error is not generated in the processing. The virtual plane may extend in a direction parallel to the z-x plane in FIG. 4.

On the other hand, the bed 110 is mounted on an underlying base frame 101, and the shape of the bed 110 and the base frame 101 and a connection structure thereof are one exemplary embodiment, but the present invention is not limited thereto.

The headstock 130 is fixed while being supported to the slide surface 113 at one side on the bed 110 to fix and rotate an end portion of one side of the work piece such that the rotational axis of the work piece S is positioned on the same virtual plane as the slide surface 113.

The tailstock 150 is formed to be moved while being supported to the slide surface 113 at the other side of the bed 110. The tailstock 150 fixes the work piece such that the mass center of the work piece is positioned on the same virtual plane as the slide surface 113 at the opposite side of the described headstock 130.

The center of the headstock 130 may be formed on the same center as the rotational axis of the work piece S, and for this, a headstock fixing block 140 fixing the headstock 130 to a corresponding position may be further included.

The headstock fixing block 140 is supported and fixed to the slide surface 113 at one side of the bed 110, and thereby may be formed of a shape surrounding a circumference of the headstock 130.

The detailed shape of the headstock fixing block 140 shown in FIG. 4 may be a rhombus of which a right and left direction distance is longer than an up and down direction distance.

Also, the center of the tailstock 150 may be formed on the same center as the rotational axis of the work piece S such that a tailstock moving block 160 that is reciprocally moved toward the end portion of the other side of the work piece S in a state of fixing the tailstock 150 at the corresponding position may be further included.

This tailstock moving block 160 is formed while being supported by the slide surface 113 at the other side of the bed 110 to move the tailstock, and the shown shape thereof is the rhombus in which the right and left distance is longer than the up and down direction distance like the described headstock fixing block 140.

That is, the headstock fixing block 140 and the tailstock moving block 160 are surface-contacted with the slide surface 113 of the bed 110, and may have the same or similar symmetry shape in a state in which they face each other.

As described above, the headstock 130 and the tailstock 150 are fixed in the state that each center thereof is fixed to the center C of rotational axis of the work piece S while supporting the work piece S such that the work piece S may be rotated with the center C of rotational axis of the work piece S as the rotational axis. At this time, the rotational axis of the work piece S is positioned on the same virtual plane as each supporting surface 135 and 155 of the headstock 130 and the tailstock 150. Also, the transferring surface of the reciprocal carriage 170 is positioned on the virtual plane, and thereby the rotational axis of the work piece S, the supporting surface 135 and 155 of the headstock 130, the tailstock 150, and the transferring surface of the reciprocal carriage 170 may all be positioned on the same virtual plane.

The reciprocal carriage 170 is fixed between the headstock 130 and the tailstock 150 such that it is installed to be guided and moved along the slide surface 113 on the bed 110 while surrounding the work piece S.

A plurality of processing modules M are mounted to the reciprocal carriage 170 at a predetermined interval such that the processing selected by a worker may be variously processed in the single machining apparatus. For example, turning, the FTS (Fast Tool Servo) processing, milling, laser processing, etc., may be selectively performed in the single machining apparatus. Also, the processing module M mounted to the reciprocal carriage 170 may be moved along the slide surface 113 of the bed disposed on the same virtual plane as the rotational axis of the work piece S, thereby preventing the offset error during the processing.

The reciprocal carriage 170 may basically include a lower body 171 and an upper body 173, and the lower body 171 and the upper body 173 may be configured to be attachable and detachable. Accordingly, the processing modules M1 and M2 positioned to face each other on both sides of the lower body 171, and the processing modules M3 and M4 of different kinds separately disposed along the circumferential direction of the work piece S at a predetermined interval according to the upper body 173, may all be provided on one reciprocal carriage 170 or may be selectively divided.

Referring to FIG. 6, in the convergence machining apparatus based on turning, the rest of the configurations except for a bed and headstock fixing member and a tailstock moving member are separately shown. As shown in FIG. 6, the headstock 130 and the tailstock 150 are connected reciprocally according to the rotational axis of the work piece S on the same center, and are rotated in the state that the work piece S is fixed.

The lower body 171 of the reciprocal carriage 170 is bent downward via the work piece S that is rotated in the fixed state thereby forming an arch shape, and the upper body 173 is connected to the end portion of both sides of the lower body 171 and is bent upward thereby forming an arch shape. That is, the lower body 171 is curved in a lower side to be concave with respect to the work piece S, and in contrast, the upper body 173 is curved in an upper side to be convex. Accordingly, the operation of the work piece S that is fixed by the headstock and the tailstock and rotated may not be influenced.

Referring to FIG. 5, both ends of the lower body 171 of the reciprocal carriage are surface-contacted on the slide surface 113 of the bed 110, thereby being moved in a straight line along the slide surface 113. Particularly, in the present exemplary embodiment, the slide surface 113 is in accord with the same virtual straight line L1 as the rotational axis C of the work piece S fixed by the headstock and the tailstock such that the offset error may be removed.

In addition, both ends of the width direction of the bed 110 may be symmetrical in structural shape, dimensions and mass, in reference to the rotational axis of the work piece S, and thus, both ends of the bed 110 may have characteristics such that the structural dynamics of each end are identical.

Holders 175 and 177 are provided on the end portions of both sides of the lower body 171 (refer to FIG. 6). The turning processing module M1 and the FTS processing module M2 are respectively mounted to the holders 175 and 177, and the processing depths of the turning processing module M1 and the FTS processing module M2 may be controlled according to the operation control of the holders 175 and 177.

Also, the milling processing module M3 and the laser processing module M4 disposed to be separated by a predetermined angle may be mounted to the upper body 173. However, the present invention is not limited to the shown structure, and the positions of the plurality of processing modules may be various. However, it is preferable that the tips of each of the processing modules M1, M2, M3, and M4 are disposed toward the rotational axis of the work piece.

Figure 7:
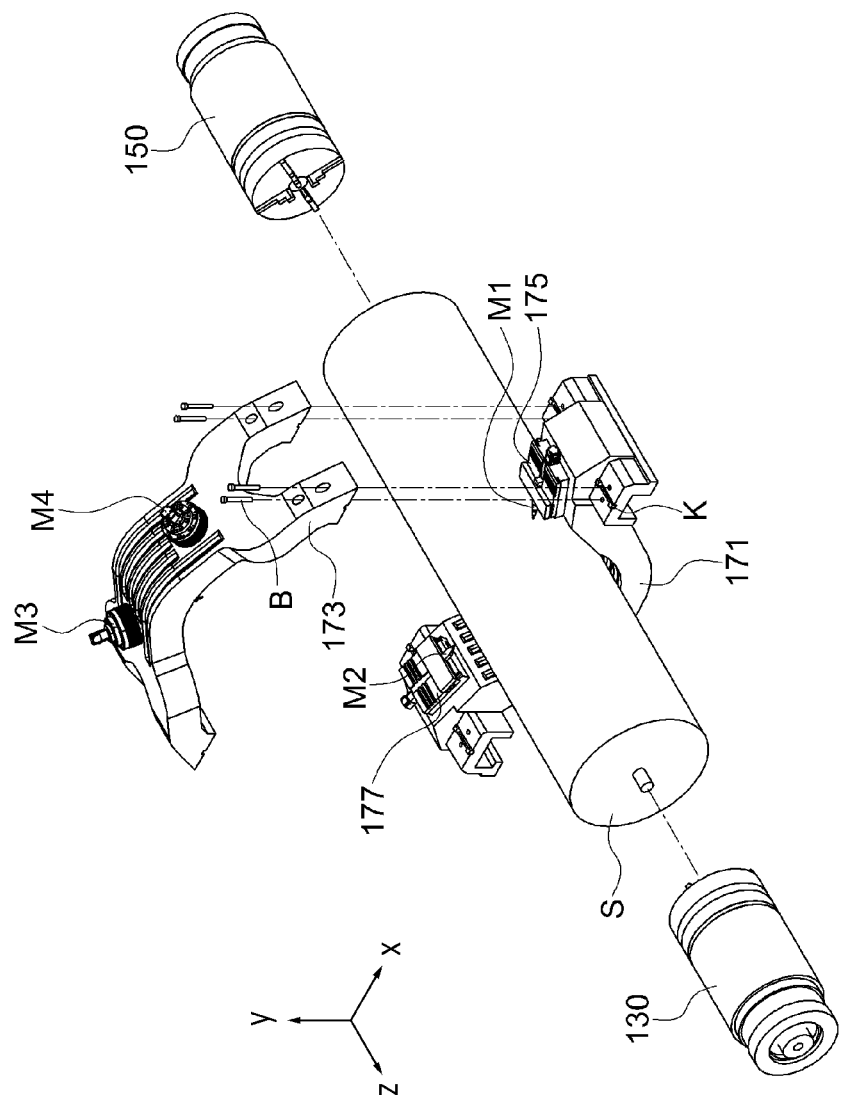
FIG. 7 is an exploded perspective view separately showing a connection state of an upper body and a lower body of a reciprocal carriage in the convergence machining apparatus based on the turning shown in FIG. 6.

FIG. 7 is an exploded perspective view showing a structure in which the upper body 173 is separated from the lower body 171 in a reciprocal carriage 170 of the convergence machining apparatus based on turning of the present invention.

As schematically described above, among the reciprocal carriage 170, the turning processing module M1 and the FTS processing module M2 may be mounted to the lower body 171, and the milling processing module M3 and the laser processing module M4 may be mounted to the upper body 173.

If necessary, when at least one processing among the turning processing and the FTS processing is performed, the upper body 173 mounting the necessary milling processing module M3 and laser processing module M4 may be separated. For this, it is preferable that the lower and upper bodies 171 and 173 of the reciprocal carriage 170 are formed with the attachable and detachable structure.

FIG. 7 is one embodiment of the structure in which the lower body 171 and the upper body 173 of the reciprocal carriage 170 are attachable or detachable structures, and in this case, a key K may be provided at a facing portion where the lower and upper bodies 171 and 173 face each other, and a bolt B for strong mutual combination when connecting them may be coupled.

As a result, in the processing work only using the turning and the FTS processing modules M1 and M2 mounted to the lower body 171 among the plurality of processing modules M1, M2, M3, and M4, the processing may be performed after separating the upper body 173, thereby improving the work convenience in the separation process after the mounting or the processing of the work piece.

As described above, according to the convergence machining apparatus based on turning according to an exemplary embodiment of the present invention, the rotational axis of the work piece, the headstock, the tailstock, and the reciprocal carriage installed with the tools may coincide in the same virtual plane with respect to the slide surface of the bed configuring the machining apparatus, thereby removing the offset error according to the mutual relative displacement. Accordingly, the accuracy of the machining apparatus is improved and the effect thereof may be maximized in a case of a device requiring high accuracy and fine processing.

Also, the offset error of the machining apparatus is removed, and simultaneously, the milling to the cylindrical work piece surface, the FTS processing, and the fine pattern of the laser processing as well as the turning processing may be performed in the single machining apparatus in convergence. Accordingly, compared with a conventional machining apparatus having a single function, errors generated in the moving of the work piece may be reduced, thereby realizing the more complex and precise high accuracy processing.

The preferable exemplary embodiment of the convergence machining apparatus based on the turning according to the present invention has been described.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A convergence machining apparatus based on turning comprising:
   a headstock and a tailstock supported by a first slide surface and a second slide surface of a bed, the headstock and a tailstock fixing a work piece between the first and second slide surfaces of the bed;
   a reciprocal carriage installed with a tool, the reciprocal carriage being supported and transferred on the first and second slide surfaces of the bed;
   wherein a rotational axis of the work piece is positioned lengthwise along a virtual plane connecting a center of a width of the first slide surface and a center of a width of the second slide surface,
   thereby preventing an offset error according to a relative displacement between the work piece and the tool in processing.

2. The convergence machining apparatus of claim 1, wherein
   the virtual plane in which the rotational axis of the work piece and the centers of width of the first and second slide surfaces of the bed are positioned is extended in a horizontal direction.

3. The convergence machining apparatus of claim 1, wherein
   the virtual plane in which the rotational axis of the work piece and the centers of the width of the first and second slide surfaces of the bed are positioned is obliquely extended by a predetermined angle ($\theta$) from a horizontal direction.

4. The convergence machining apparatus of claim 1, wherein
   the headstock and the tailstock include a supporting surface supported by the first and second slide surfaces of the bed, and the center of the width of the supporting surface is positioned on the virtual plane.

5. A convergence machining apparatus based on turning, comprising:
   a bed including a first slide surface and a second slide surface disposed at both ends of a width direction of an upper surface of the bed;
   a headstock fixed at one side on the bed;
   a tailstock installed at the other side of the bed to be moved, and the tailstock and the headstock fixing a work piece to be rotated therebetween; and
   a reciprocal carriage supported by the first and second slide surfaces while surrounding at least portion of the work piece fixed between the headstock and the tailstock from the outside and including a processing module thereby being guided along the slide surfaces and being installed to be movable,
   wherein a rotational axis of the work piece is positioned lengthwise along a virtual plane connecting a center of a width of the first slide surface and a center of a width of the second slide surface.

6. The convergence machining apparatus of claim 5, further comprising
   a plurality of processing modules disposed at a predetermined interval on the reciprocal carriage and respectively installed to have a tip be arranged toward the rotational axis of the work piece to perform different processing.

7. The convergence machining apparatus of claim 6, wherein
   the plurality of processing modules includes a pair of turning processing modules arranged opposite to each other toward the rotational axis of the work piece and performing turning processing, an FTS (Fast Tool Servo) processing module performing FTS processing, a milling processing module mounted from an upper side of the reciprocal carriage toward the rotational axis of the work piece and performing milling processing, and a laser processing module performing laser processing.

8. The convergence machining apparatus of claim 5, wherein
   the virtual plane in which the rotational axis of the work piece and the centers of the width of the first and second slide surfaces of the bed are positioned is extended in a horizontal direction.

9. The convergence machining apparatus of claim 5, wherein
   the virtual plane in which the rotational axis of the work piece and the centers of the width of the first and second slide surfaces of the bed are positioned is obliquely extended at a predetermined angle ($\theta$) from a horizontal direction.

10. The convergence machining apparatus of claim 5, further comprising:
    a headstock fixing block fixed at one side on the bed and surrounding the headstock to be fixed; and
    a tailstock moving block formed to be moved at the other end on the bed thereby surrounding the tailstock and moving the tailstock when attaching and detaching the work piece, and
    the headstock fixing block and the tailstock moving block symmetrically face each other on the bed thereby forming a rhombus shape.

11. The convergence machining apparatus of claim 5, wherein
    the reciprocal carriage includes
    a concave lower body curving around the work piece fixed between the headstock and the tailstock.

12. The convergence machining apparatus of claim 11, wherein
    the reciprocal carriage further includes
    a convex upper body connected to be attachable and detachable to the lower body and curves around the work piece thereby forming an arch shape.

13. The convergence machining apparatus of claim 5, wherein
    the bed are symmetrical in reference to a plane including the rotational axis of the work piece and being perpendicular to the upper surface of the bed.

* * * * *